United States Patent [19]

Chin et al.

[11] Patent Number: 4,913,481
[45] Date of Patent: Apr. 3, 1990

[54] CLEAN ROOM GRIPPER

[75] Inventors: Laurence D. Chin, West Newton; Christopher J. Hiscock, Georgetown, both of Mass.

[73] Assignee: Applied Power Inc., Milwaukee, Wis.

[21] Appl. No.: 243,872

[22] Filed: Sep. 13, 1988

[51] Int. Cl.⁴ .............................................. B25J 15/08
[52] U.S. Cl. .................................... 294/88; 294/119.1; 901/37
[58] Field of Search ...................... 294/119.1, 88, 86.4, 294/106; 901/39, 37, 31, 49, 50; 414/729, 741, 8, 751; 269/32, 34, 216, 229, 233; 279/110, 121

[56] References Cited

U.S. PATENT DOCUMENTS

| | | |
|---|---|---|
| 3,135,396 | 6/1964 | Grainger . |
| 3,759,563 | 9/1973 | Kitamura . |
| 4,354,785 | 10/1982 | Garnier . |
| 4,474,518 | 10/1984 | Critchley et al. . |
| 4,607,873 | 8/1986 | Nusbaumer ..................... 294/119.1 |
| 4,667,998 | 5/1987 | Borcea et al. . |
| 4,671,553 | 6/1987 | Bertini . |
| 4,707,013 | 11/1987 | Vranish et al. . |
| 4,715,637 | 12/1987 | Hosoda et al. . |
| 4,723,806 | 2/1988 | Yuda . |

FOREIGN PATENT DOCUMENTS 2041262  9/1980  United Kingdom .

Primary Examiner—Johnny D. Cherry

[57] ABSTRACT

A clean room gripper having sliding jaws and including a pressurized piston cylinder and actuator section for moving the jaws towards and away from one another. The jaws are in the form of upper and lower finger sections, with the lower section being provided with a sliding seal located between it and a mating outer surface of an evacuated chamber, whereby no particles or dust created within the unit because of mechanical action will be allowed to escape from the gripper during operation to add to contamination of the environment in a clean room.

10 Claims, 3 Drawing Sheets

CLEAN ROOM GRIPPER

FIELD OF THE INVENTION

This invention relates to a gripper device for use in a clean room. Such devices are required to manipulate parts or perform some gripping function without contributing negatively to the clean room environment, i.e. without adding any dust or particles which may be created internally within the gripper unit during its operation.

BACKGROUND OF THE INVENTION

Grippers for use in clean rooms of the type with which the invention is concerned have previously been provided with means to attempt to eliminate contaminants as shown for example in U.S. Pat. No. 3,135,396, issued June 2, 1964 to Grainger. As shown in that patent a "bellows" type plastic bag is used in combination with a pair of pivoting gripper jaws. In such a device the bag, usually of PVC material, is captured at its ends in grooves in the jaws themselves and extends to enclose the entire manipulating apparatus. Such devices fatigue and are not long lived, in addition to not being readily adaptable for use in sliding jaw grippers.

Sliding jaw grippers per se are also known, as shown for example in U.S. Pat. No. 4,723,806, issued Feb. 9, 1988 to Yuda. That patent discloses a parallel robotic gripper having a vertically moveable member for opening and closing parallel gripping members which are carried on master jaws having lateral longitudinally extending slots therein for minimizing machining necessary to provide effective mounting for the slideable master jaws on longitudinally aligned horizontally spaced rails.

The cleanliness requirements for many processing and manufacturing tasks are becoming extremely strict. The environmental changes, and the type and amount of allowable contamination in each operation are monitored closely to ensure that quality products are made on a consistent basis. The principal users of clean rooms are advanced industries making use of thin film technology. The main products manufactured in ultraclean environments include VLSI semiconductors, compact discs, computer memory discs, magnetic and video tapes, precision mechanisms and pharmaceuticals.

Many of the processes which are performed in clean rooms are either partially or fully automated so that humans may be removed from the environment. It has been found that human beings are the single largest contributor to clean room particle contamination. Also, every piece of machinery which is used in a clean room must meet strict guidelines as to the size and amount of particles which it may release, and the materials used in its construction. These guidelines apply most strictly to the assembly machinery which will be situated near the products being produced, and to the manipulators used to handle and move the product.

Currently, the manipulators used to handle the products in a clean room are custom made or are modified to meet the cleanliness requirement. This is usually done at great expense and at a large sacrifice to the work envelope, and the performance of the automated workcell. The typical way of doing this is to enclose the entire manipulator inside of a bellows or enclosure as shown in the Grainger patent, and then to evacuate the entire set-up. The use of such "bellows" is a clumsy way of sealing because the bellows must be custom made in each case, and as already indicated does deteriorate at a rapid rate, adding to the particle contamination in the workcell. In most cases the standard production type grippers must also be modified to accept the bellows arrangement (as was true in the Grainger device which uses machined grooves to anchor the ends of the bellows). The necessary vacuum lines and porting used to evacuate the gripper inside the bellows are often set up awkwardly on the outer portions of the gripper, thus increasing the overall package size by 2-3 times.

OBJECTS OF THE INVENTION

It is one object of the invention to provide a sealed automatic gripping device for use in clean room environments, whereby it allows for automated gripping, assembly, and material handling within an extremely clean environment.

A further object of the invention is to provide a gripper device having sliding jaws which incorporates roller bearing actuation, adjustable guide rails, and a plurality of sliding seals which enclose the mating surfaces of the gripper in an evacuated chamber so that no particles will escape from the unit during actuation to add to the contamination of the environment.

A still further object of the invention is to provide a sliding seal for mating contact surfaces in a gripper which are prone to create contaminating particles in a clean room environment. Such sliding seal configuration makes the gripper a self contained unit which reduces the package size and eliminates all additional cost and design needed to enclose the unit.

Another object of the invention is to provide a sealing configuration for a gripper which adds only a minimum amount of friction to the system, thereby allowing higher grip forces to be achieved.

Still another object of the invention is to provide means incorporated into a gripper unit to evacuate contaminating particles away from the work area which performs the gripping function.

An additional object is to provide roller bearing actuation for a gripper which reduces actuation force and increases available gripping force.

A further additional object of the invention is to provide adjustable guide rails for a slideable jaw gripper to control racking, and wear of gripper elements and to limit or reduce particle generation caused by the sliding members due to uneven wear.

DETAILED DESCRIPTION

Figure 1:
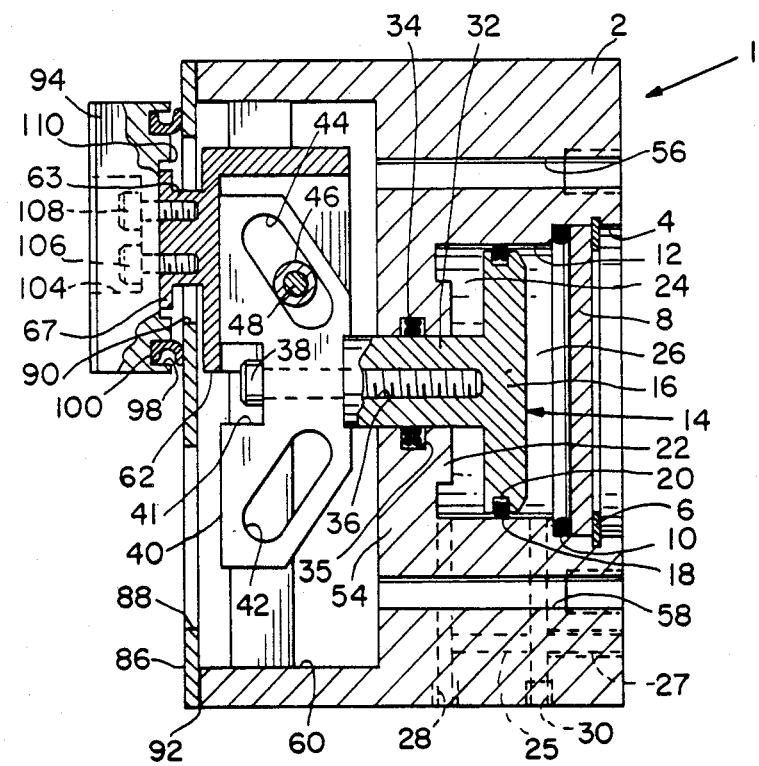
FIG. 1 is a cross-sectional view through a preferred embodiment of the gripper of the invention with one of the gripper elements omitted.
Figure 2:
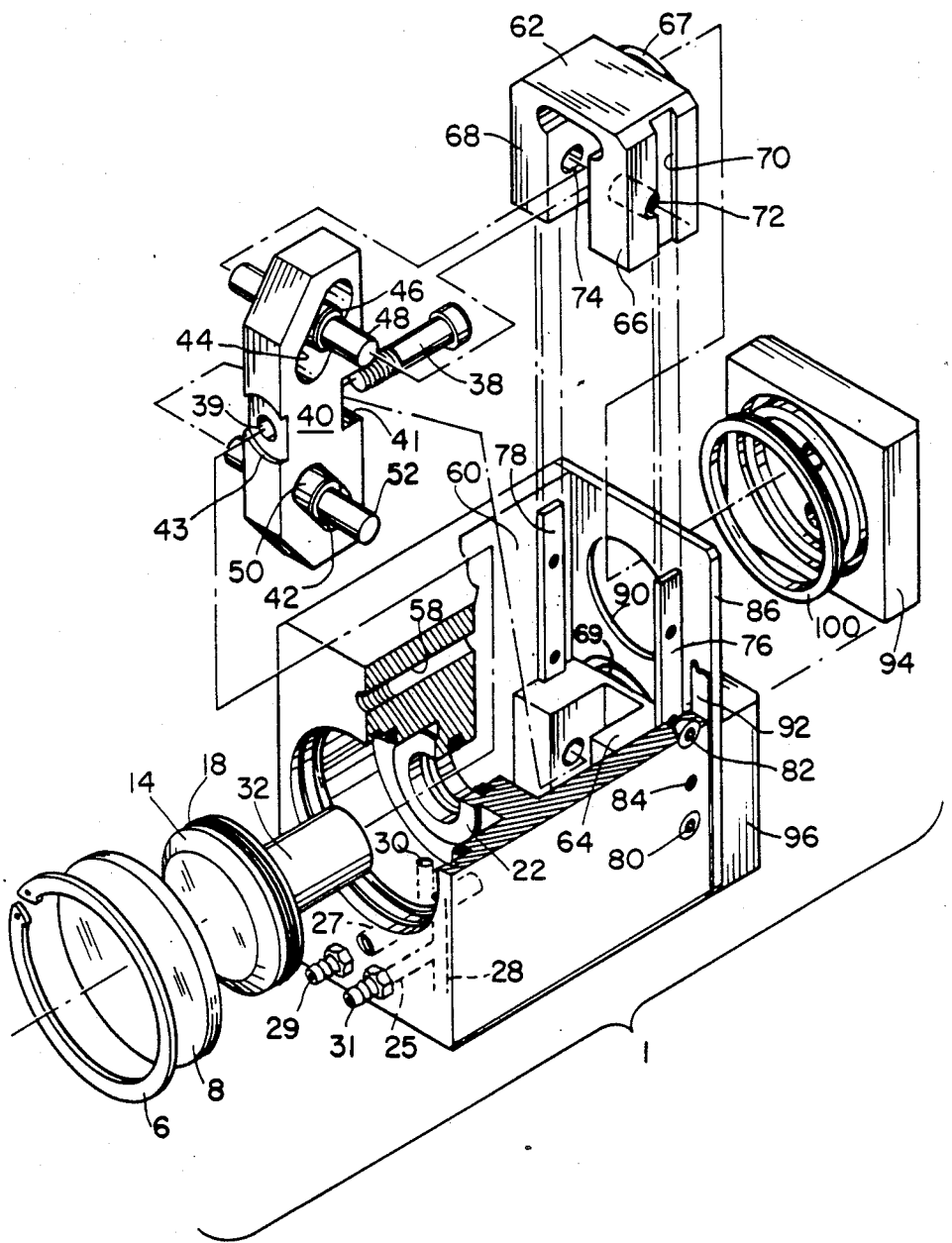
FIG. 2 is an exploded perspective view of the gripper of FIG. 1 with a portion of the device removed for the sake of clarity.

As shown in FIGS. 1 and 2, the gripper 1 of the invention comprises a housing 2 which has a series of bores centrally through it. At its upper end there is the bore 4, which bore is closed by a piston end cap 8, which is pressed against an O-ring seal 10 by a retaining ring 6. Below the bore 4 is a reduced diameter piston bore 12, which is intended to receive tee piston 14. The piston 14 consists of a piston head 16 and central piston shaft 32. The outer circumference of the piston head 16 is grooved as at 20 to receive a piston seal 18 to enable the piston to have a sliding sealed fit within the bore 12. At the bottom of the bore 12 is a raised boss 22, whose purpose is explained more fully hereinafter.

The positioning of the piston head 16 within the bore 12 divides the space in the bore into an upper chamber 26 and a lower chamber 24. Air passage 28 provides a passage for directing air into the lower chamber 24 to move the piston away from the boss 22. The passage 28 is located on the side of the gripper 1. If it is desired to provide air from the top of the gripper the interconnecting passage 25 is arranged to join the passage 28. Similarly, passage 30 enables air to enter the upper chamber 26 to move the piston towards the boss 22. The passage 30 is located on the side of the gripper 1. If it is desired to provide air from the top of the gripper the interconnecting passage 27 is provided to join the passage 30. End fittings 29 and 31 are provided to enable air hose connections to the passages leading to the respective upper and lower chambers (shown in FIG. 2 as connected to the top interconnecting passages 27 and 25, respectively).

The central part 54 of the housing 2 is provided with a recess 35 which receives a quad seal 34 to further guide the piston in its movement. The central piston shaft 32 is threaded as at 36 to receive the bolt 38 which fastens a cam plate 40 to the piston through a bore 39 within the cam plate. The lower surface of the cam plate is provided with a recessed slot 41 to receive the head of the bolt 38. The upper surface of the cam plate 4 is provided with a locating bore 43 to receive the central piston shaft 32.

Cam plate 40 is provided with the inclined slots 42, 44. Roller 46 is arranged to traverse within the slot 44, and roller 50 is arranged to traverse within the slot 42 (see FIG. 2). Dowel pin 48 carries tee roller 46, and dowel pin 52 carries the roller 50. The cam plate 40 moves within an enlarged cam plate chamber 60 in the lower portion of the housing 2. Evacuation ports 56 and 58 are arranged to allow for the removal of any debris from the chamber 60 that may be generated by the movement of the gripper jaws and the rollers within the slots. Two such ports are shown because a more even flow can be attained, however, it is to be understood that one or even more than two may be used.

A pair of inner finger blocks 62 and 64 are shown which are connected to the cam plate. Only one of such blocks will now be described, it being understood that they are similarly constructed. Block 62 is generally formed in a U-shape, having depending legs 66 and 68, each having a slot 70 (only one is shown in FIG. 2) on its outer surface. The slots 70 serve to enable the mounting of the finger block 62 on the guide rails 76 and 78. The legs 66 and 68 are also respectively provided with the bores 72 and 74 to receive the dowel pin 48, which carries the roller 46. The inner finger block 64 is similarly constructed to be mounted on the guide rails 76 and 78 and to receive the dowel pin 52 which carries the roller 50.

A series of screws such as 80, 82 are provided to fasten the rail 76 to the housing. The rail 78 is similarly fastened to the housing. A set screw 84 is provided (there may be a series of such set screws) to allow for the adjusting of the rail inwardly and outwardly of chamber 60 to obtain the optimum finger tracking.

Figure 5:
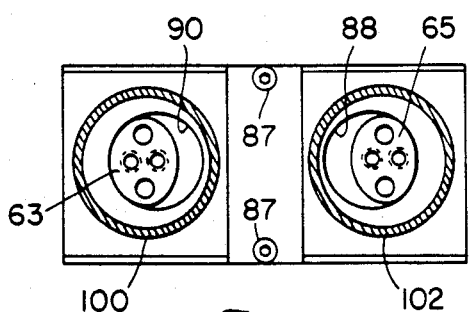
FIG. 5 is a view taken along line 5—5 of FIG. 4.

The lower end of the chamber 60 is closed by a seal plate 86, which is fastened to the housing 2 by the bolts 87 (see FIG. 5). The plate 86 is provided with the circular openings 88 and 90. A sealant or gasket 92 is provided beneath the plate 86, which may be any clean room sealant such as Teflon.

The outer finger blocks 94 and 96 are shown as generally rectangular in shape, but may be any shape desired. The lower end of the inner finger blocks 62 and 64 are provided with reduced sections 63 and 65, respectively. The reduced section enables travel within the openings 90 and 88, respectively, in the plate 86. Although shown as being elliptical in form, any shape may be used. The lowermost portion of the inner finger blocks 62, 64 terminate in circular mounting pads 67 and 69, respectively. The size of the mounting pads is such as to reduce any tendency towards tipping of the outer finger blocks. The outer finger block 94 is provided with a groove 98 on its upper surface to receive the sliding seal 100. The finger block 96 similarly receives a sliding seal 102. The reduced sections 63 and 65 which connect with the respective outer finger blocks 94 and 96 pass through openings 90 and 88 in the housing plate 86. While the openings 90 and 88 are larger in size than the reduced sections 63 and 65, the respective sliding seal means 100 and 102 are of sufficient size to continually cover the respective openings throughout the movement of the reduced sections in the openings. These seals are preferably U-shaped, although any shape may be used. The material of the seal is Teflon or stainless steel, or any other well known clean room sealing material. The U-shape readily enables spring-loading or self loading of the seal. The lower end of the block 94 is provided with a central opening or slot 104 to accept the mounting bolts 106, 108 for fastening the outer finger block 94 to the inner finger block 62. The upper end of the block 94 is recessed as at 110 to locate the mounting pad 67 of the inner finger block 62. The block 96 is similarly constructed. Shims may be used between the inner and outer finger blocks to enable changing the pressure on the seal. The various parts such as the housing, cam plate and finger blocks may be made of stainless steel, or if of other material, it is preferably plated with a Teflon impregnated anodic hard coating or electrolytic nickel, or other well known clean room material or coating.

Figure 8:
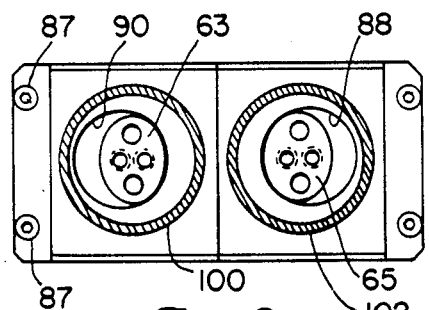
FIG. 8 is a view taken along line 8—8 of FIG. 7.
Figure 4:
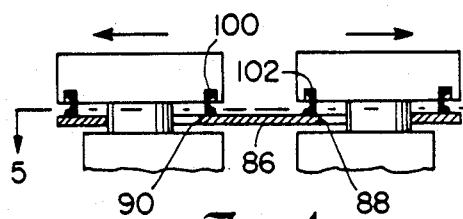
FIG. 4 is a partial cross-sectional view through the lower portion of the gripper of FIG. 3 illustrating the positioning of the lower finger portions of the gripper of FIG. 3.
Figure 7:
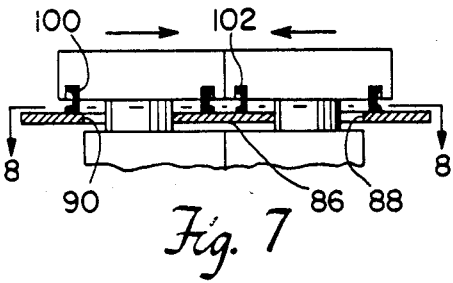
FIG. 7 is a partial cross-sectional view through the lower portion of the gripper of FIG. 6 illustrating the positioning of the lower finger portions of the gripper of FIG. 6.
Figure 3:
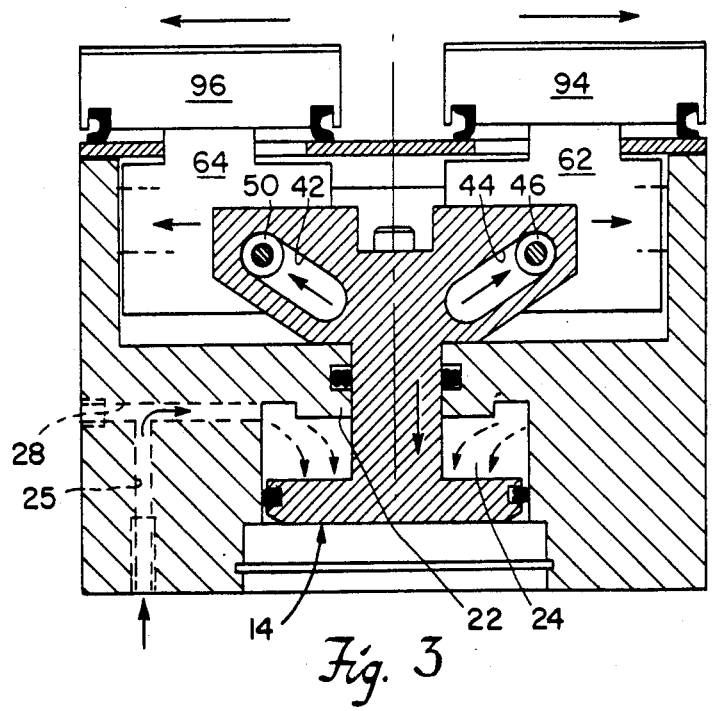
FIG. 3 is a cross-sectional view through the device of FIG. 1 illustrating the operation of the jaws to their outermost extremity of separation.
Figure 6:
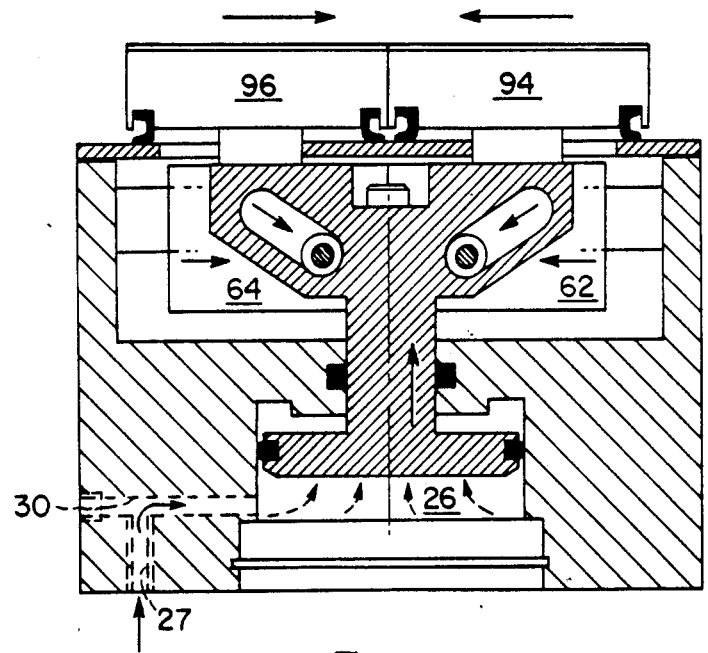
FIG. 6 is a cross-sectional view through the device of FIG. 1. illustrating the operation of the jaws to their innermost extremity of operation.

The operation of the gripper of the invention will now be described. With reference to FIGS. 3, 4 and 5 the movement of the gripper outer finger blocks 94 and 96 to their outermost position is accomplished by air being introduced through passages 25 and 28 to bounce off of the boss 22 and move the piston upwardly in chamber 24. This movement carries the cam plate in the same direction and moves the slots 42 and 44 in the same direction, thus causing the rollers 50 and 46, respectively, to move their respective dowel pins and because of their interconnection as described above, move the inner and outer finger blocks 64,96 and 62,94 to their outermost position as shown. The openings 88 and 90 in the seal plate 86 are not uncovered, and the seals 100 and 102 wipe on the lower surface of the plate 86. Similarly, with reference to FIGS. 6, 7 and 8 the movement of the gripper outer finger blocks 94 and 96 to their innermost position is accomplished by air being introduced through passages 27 and 30 into chamber 26 to move the piston downwardly. This movement carries the cam plate in the same direction and moves the slots accordingly so that the rollers traverse the slots and carry the inner and outer finger blocks 64,96 and 62,94 towards one another. It is to be noted that both the inner and outer finger blocks move linearly because of the cam-slot arrangement. The meeting of the outer finger blocks determines the closed position and not the bottom of the slots as shown in FIG. 6. The difference in dimensioning is not shown in the drawings but it is to be understood that a slight dimensional difference is provided to enable this positioning. Many variations and modifications of the structure may be made while still coming within the spirit and scope of the invention as above described. For example, instead of strictly linear movement, the surface of the housing, or seal plate 86, may be arcuate to obtain a rotary movement of the gripper fingers instead of purely linear movement.

What we claim is:

1. A sliding jaw gripper including:
   a housing;
   gripper elements formed as inner and outer finger blocks which are joined together;
   said inner finger blocks being mounted upon guide rails within the housing to ensure uniform tracking of the finger blocks;
   means for actuating the gripper elements towards and away from one another
   means for adjusting the guide rails inwardly of the housing so as to enable optimum tracking of the finger blocks; and
   sliding seal means located between the housing and the gripper elements to permit movement of the gripper elements with minimum friction while preventing the escape of any contaminating material from within the housing to the environment.

2. A sliding jaw gripper according to claim 1 in which the inner finger blocks have reduced sections which pass through respective openings in the housing and connect with the respective outer finger blocks; said openings in the housing being larger in size than the reduced sections of the inner finger blocks passing through the adjacent openings; and wherein the sliding seal means are of a sufficient size to continually cover the openings throughout the movement of the reduced sections of the inner finger blocks.

3. A gripper according to claims 1 or 2 in which the sliding sliding seal means are mounted on the upper portion of the outer finger blocks in a wiping arrangement with the outer adjacent portion of the housing.

4. A sliding jaw gripper according to claim 1 in which the means for actuating the gripper elements includes roller bearings to reduce the actuation force and increase the available gripper force.

5. A gripper according to claim 1 or 4 in which the means for actuating the gripper elements are a cam plate having cam slots and cam means associated with a portion of the gripper elements to cause their movement towards and away from one another.

6. The gripper according to claim 5 including actuating means for the cam plate comprising a piston cylinder means arranged within the housing to which the cam plate is affixed.

7. A sliding jaw gripper according to claim 1 in which the housing is provided with a chamber to receive the gripper element actuating means and a portion of the gripper structure, and evacuation means contained within the housing to enable removal from the said chamber of any contaminant materials.

8. A gripper according to claim 1 in which the outer finger blocks are provided with a groove to receive shims, said shims being formed so as to provide a preloading force upon said sliding seal means to accomplish a more uniform wiping action on the surface of the housing in which they are in contact.

9. A gripper according to claim 1 wherein the sliding seal means are generally U-shaped in cross section.

10. A gripper according to claim 1 in which means are provided to enable pressure loading of the sliding seal means upon the housing.

* * * * *